(12) United States Patent
Ewald et al.

(10) Patent No.: US 8,709,964 B2
(45) Date of Patent: Apr. 29, 2014

(54) PROCESS FOR PRODUCING A CARBON-COMPRISING SUPPORT

(75) Inventors: Bastian Ewald, Ludwigshafen (DE); Claudia Querner, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 40 days.

(21) Appl. No.: 13/232,758

(22) Filed: Sep. 14, 2011

(65) Prior Publication Data

US 2012/0065052 A1    Mar. 15, 2012

Related U.S. Application Data

(60) Provisional application No. 61/382,499, filed on Sep. 14, 2010.

(51) Int. Cl.

| | | |
|---|---|---|
| B01J 27/22 | (2006.01) | |
| B01J 21/18 | (2006.01) | |
| B01J 23/00 | (2006.01) | |
| B01J 23/40 | (2006.01) | |
| B01J 23/74 | (2006.01) | |
| B01J 27/24 | (2006.01) | |
| H01M 4/02 | (2006.01) | |
| H01M 4/36 | (2006.01) | |

(52) U.S. Cl.
USPC .......... 502/177; 502/182; 502/185; 502/200; 429/523; 977/745

(58) Field of Classification Search
CPC .......... B01J 27/22; B01J 27/24; B01J 21/18; B01J 31/0234; B01J 32/00; B01J 37/08; B01J 37/34; H01M 4/04; H01M 4/08; H01M 4/88
USPC .......... 502/177, 182, 185, 200; 977/745; 429/523

See application file for complete search history.

(56) References Cited

U.S. PATENT DOCUMENTS

| | | | |
|---|---|---|---|
| 6,514,897 B1 * | 2/2003 | Moy et al. ............ | 502/174 |
| 6,897,178 B1 * | 5/2005 | Thompson et al. ...... | 502/185 |
| 7,129,373 B2 | 10/2006 | Coleman et al. | |
| 7,169,731 B2 * | 1/2007 | Chondroudis et al. ... | 502/185 |
| 7,304,012 B2 * | 12/2007 | Green et al. .......... | 502/180 |
| 7,390,920 B2 | 6/2008 | Coleman et al. | |
| 7,534,739 B2 * | 5/2009 | Hilgendorff et al. .... | 502/162 |
| 7,618,915 B2 * | 11/2009 | Popov et al. .......... | 502/180 |
| 7,923,403 B2 * | 4/2011 | Ma et al. ............. | 502/185 |
| 7,932,419 B2 | 4/2011 | Liu et al. | |
| 2004/0010160 A1 | 1/2004 | Coleman et al. | |
| 2005/0176989 A1 | 8/2005 | Coleman et al. | |
| 2005/0176990 A1 * | 8/2005 | Coleman et al. ....... | 562/11 |
| 2006/0068988 A1 | 3/2006 | Coleman et al. | |
| 2008/0318768 A1 | 12/2008 | Coleman et al. | |
| 2010/0041546 A1 | 2/2010 | Coleman et al. | |
| 2011/0301381 A1 | 12/2011 | Coleman et al. | |
| 2013/0295483 A1 * | 11/2013 | Monden et al. ........ | 429/481 |

FOREIGN PATENT DOCUMENTS

| | | | | | |
|---|---|---|---|---|---|
| CN | 1960042 | * | 5/2007 | ........ | H01M 4/90 |
| CN | 1960042 A | | 5/2007 | | |
| CN | 101411975 | * | 4/2009 | ........ | B01J 23/30 |
| CN | 101411975 A | | 4/2009 | | |
| WO | WO 03/068387 A1 | | 8/2003 | | |
| WO | WO 2005/016519 A1 | | 2/2005 | | |
| WO | WO 2006/002228 A2 | | 1/2006 | | |
| WO | WO 2006/002228 A3 | | 1/2006 | | |

OTHER PUBLICATIONS

Written Opinion for PCT/IB2011/054014.*
X. G. Yang et al., "Nanostructured Tungsten Carbide Catalysts for Polymer Electrolyte Fuel Cells", Applied Physics Letters, vol. 86, May 24, 2005, pp. 224104 1-3.
Karl J.J. Mayrhofer et al., "Non-Destructive Transmission Electron Microscopy Study of Catalyst Degradation Under Electrochemical Treatment", Journal of Power Sources, vol. 185, Aug. 13, 2008, pp. 734-739.
International Search Report issued Mar. 1, 2012, in International application No. PCT/IB2011/054014.

* cited by examiner

*Primary Examiner* — Patricia L Hailey
(74) *Attorney, Agent, or Firm* — Oblon, Spivak, McClelland, Maier & Neustadt, L.L.P.

(57) ABSTRACT

The invention relates to a process for producing a surface-modified carbon-comprising support, which comprises the following steps:
- (a) mixing of the carbon-comprising support with at least one metal compound, a carbon- and/or nitrogen-comprising organic substance and optionally a dispersion medium,
- (b) optionally evaporation of the dispersion medium at a temperature in the range from 40 to 200° C.,
- (c) heating of the mixture to a temperature in the range from 500° C. to 1200° C. to form metal carbides, metal nitrides, metal oxycarbides, metal oxynitrides, metal carboxynitrides and/or metal carbonitrides on the carbon-comprising support.

The invention further relates to a use of the surface-modified carbon-comprising support.

18 Claims, No Drawings

PROCESS FOR PRODUCING A CARBON-COMPRISING SUPPORT

The invention relates to a process for producing a material comprising carbide-, nitride-, carbonitride-, carboxide-, oxynitride- or carboxynitride-functionalized carbon, as is used, for example, as support for catalytically active material in catalysts. The invention further relates to a use of the material comprising carbide-, nitride-, carbonitride-, carboxide-, oxynitride- or carboxynitride-functionalized carbon.

Carbon-comprising supports are used, for example, as supports for catalytically active material for heterogeneous catalysts. In a specific example, these supports are used for electrochemical reactions. Carbon supports (conductive carbon blacks) are usually used for electrochemical applications since they have a sufficiently good electrical conductivity. Conductive carbon blacks usually have a BET surface area in the range from 100 to 1500 $m^2/g$ and therefore make it possible to apply catalytically active material in finely divided form and also to produce porous electrode layers. The latter is important to ensure wetting with the electrolyte and also to be able to transport starting materials and products. However, a disadvantage of conductive carbon blacks as supports is that the carbon can be oxidized to $CO_2$ at high potentials and/or temperatures and the electrode structure or support structure is therefore destroyed. This irreversibly impairs the performance and the catalytically active material can become detached from the support, as a result of which it is no longer available for the electrochemical reaction. This is described, for example, in Mayrhofer et al., J. Power Sources, 185 (2008), 734-739.

Transition metal carbides or nitrides are known for their thermal and chemical resistance as bulk materials and are usually also electrically conductive. Some carbides and nitrides also have catalytic properties. For example, tungsten carbide has been tested as platinum-free anode catalyst in fuel cells, but the performance is far below that of comparable platinum catalysts. Thus, for example, Yang and Wang, Applied Physics Letter, 86 (2005), Art. 224104, describe the production and measurement of a cell having an electrode having 0.48 mg of $WC/cm^2$ on the anode side and an electrode having 0.3 mg of $Pt/cm^2$ on the cathode side at a temperature of 80° C. Hydrogen was supplied to the anode side and air was supplied to the cathode side. The power at 0.2 $A/cm^2$ was about 110 $mW/cm^2$. In comparison, the power of an electrode having 0.05 mg of $Pt/cm^2$ (i.e. 1/10 loading) on the anode is about 160 $mW/cm^2$ under otherwise identical conditions. The differences become particularly clear at high power densities of more than 1 $A/cm^2$. The WC anode barely achieves 1 $A/cm^2$, while the Pt anode still displays a power of more than 750 $mW/cm^2$ at 1.5 $A/cm^2$.

To achieve a high catalytic activity, the carbides or nitrides have to be very finely divided, i.e. have an average diameter of less than 10 nm. This can result in oxidation reactions on the particle surface, which significantly reduces the chemical and/or electrochemical stability. Transition metal carbides and nitrides usually have a very low BET surface area of less than 5 $m^2/g$, which restricts their use as supports for catalytically active metals since the latter cannot be applied in sufficiently finely divided form.

WO 2006/002228 describes a process in which tungsten carbide or molybdenum carbide is used for modifying the surface of carbon supports. This is said to increase the stability of the overall system of carbide and carbon. The method comprises reduction of the metal on the support, e.g. ammonium tungstate, by means of $NaBH_4$ and subsequent heat treatment at from 900 to 1000° C. to form the carbide. As an alternative, decomposition of an organometallic precursor under nitrogen (up to 1100° C.) is also described in the case of Ti.

Disadvantages of the method are the limitation to a few transition metal carbides, in particular tungsten and molybdenum, the multistage nature of the synthesis, the necessity of high temperatures of over 1000° C. for preparing the carbides since at low temperatures a large proportion of oxides remains and/or the deposition does not occur quantitatively. At the relatively high temperatures required, relatively large nanoparticles having an average diameter of more than 50 nm are also obtained.

It is an object of the invention to provide a process for modifying the surface of carbon supports by means of transition metal carbides and/or nitrides in order to increase the corrosion stability, which process can be carried out at relatively low temperatures, by means of which finely divided particles for a higher catalytic activity can be produced, which is applicable not only to tungsten and molybdenum but also to further metals and in which the initial properties of the carbon black, in particular the BET surface area, the processability and the conductivity, are not altered in a disadvantageous way.

The object is achieved by a process for producing a carbon-comprising support, which comprises the following steps:
  (a) mixing of the carbon-comprising support with at least one metal compound, a carbon- and/or nitrogen-comprising organic substance and optionally a dispersion medium,
  (b) optionally evaporation of the dispersion medium at a temperature in the range from 40 to 200° C.,
  (c) heating of the mixture to a temperature in the range from 500° C. to 1200° C. to form metal carbides, metal nitrides, metal oxycarbides, metal oxynitrides, metal carboxynitrides and/or metal carbonitrides on the carbon-comprising support.

The surface of the carbon-comprising support is modified by means of the process of the invention. The modification can be in the form of a closed or porous layer or as a partly covered surface of the carbon-comprising support or in the form of individual particles. The carbide, nitride, carbonitride, oxynitride, carboxide or carboxynitride particles produced by the process of the invention can also be present in a plurality of layers which partly or completely cover the surface of the carbon-comprising support. In the following, reference will be made to a layer in the interests of simplicity, with all abovementioned cases being encompassed.

The modification by means of the process of the invention leads to an increase in the corrosion stability of the support. The carbon is bound to the surface of the support by the metal carbides, metal nitrides, metal oxycarbides, metal oxynitrides, metal carboxynitrides and/or metal carbonitrides produced in step (c) and no longer undergoes any reaction with the oxygen surrounding the support. In this way, the corrosion of the carbon-comprising support can be reduced or even avoided completely.

As a result of the use of a carbon- and/or nitrogen-comprising substance in step (a), the reaction proceeds quantitatively even at temperatures lower than in the prior art and can be applied to various transition metals. Due to the lower temperature, the carbides, nitrides, carbonitrides, carboxides, oxynitrides and/or carboxynitrides are more finely divided, have a higher BET surface area and are more catalytically active. Compared to finely divided unsupported carbides, nitrides, carbonitrides, carboxides, oxynitrides and/or carboxynitrides, the carbon-supported carbides, nitrides, carbonitrides, carboxides, oxynitrides and/or carboxynitrides produced according to the invention are more sintering and oxidation stable than unsupported compounds of this type.

The use of metal compounds, preferably metal salts, and mixtures thereof with the carbon- and/or nitrogen-comprising organic substance, optionally with use of a dispersion medium, results in formation of reactive precursor substances, which makes a more rapid reaction possible. In addition, the elimination of by-products in the form of volatile compounds, for example ammonium chloride, has an advantageous effect on the reaction.

Furthermore, achievement of a BET surface area of more than 25 m$^2$/g makes it possible to apply catalytically active materials in finely divided form. This means that the catalytically active surface of the catalyst is not significantly altered by the formation of the layer comprising metal carbides, metal nitrides, metal oxycarbides, metal oxynitrides, metal carboxynitrides and/or metal carbonitrides on the surface of the support and a catalytic activity which is consistently as high as that of carbon-supported catalysts is thus achieved. In addition, a higher long-term stability of a catalyst produced using the carbon-comprising support can be achieved as a result of the improved corrosion stability of the support.

A further advantage of the use of the carbon-comprising support for producing catalysts is that discharge of catalytically active material can be prevented by the layer comprising metal carbide, metal nitride, metal oxycarbide, metal oxynitride, metal carboxynitride and/or metal carbonitride, so that the catalytic activity of the catalyst produced is not reduced during operation by discharge of catalytically active material. The fact that the catalytically active material does not become detached from the support is also related to the fact that the particles of the catalytically active material adhere better to the support as a result of the layer comprising metal carbide, metal nitride, metal oxycarbide, metal oxynitride, metal carboxynitride and/or metal carbonitride. Due to the catalyst particles barely sintering and not becoming detached from the support, the catalytic surface of catalyst particles which have been produced using the carbon-comprising support according to the invention remains stable over a long period of time and the performance, for example of an electrode, for which the catalyst is used, remains high.

For electrochemical applications, catalytically active materials are applied to an electrically conductive support or mixed with an electrically conductive support. As support, use is generally made of carbon, for example in the form of conductive carbon blacks, graphites or structured carbons such as graphenes or nanotubes. Carbon supports used normally have a high specific surface area (e.g. BET surface area) which makes fine dispersion of the particles of catalytically active material, which are usually present as nanoparticles, possible. The BET surface area is generally above 100 m$^2$/g and can be up to 1500 m$^2$/g. However, these carbon supports, for example Vulcan XC72® having a BET surface area of about 250 m$^2$/g or Ketjen Black EC 300J® having a BET surface area of about 850 m$^2$/g, have the disadvantage that they corrode very quickly when, for example, high overpotentials occur. In the case of carbons having a relatively high content of graphitic material, corrosion is delayed.

The corrosion of carbon-comprising supports can, for example, be compared by subjecting them to potentials above 1 V in the presence of water, for example in a humid stream of nitrogen or in an aqueous electrolyte solution, optionally at elevated temperature. Here, the carbon is converted into carbon dioxide, and the carbon dioxide formed can be measured. The higher the temperature and the higher the potential, the more rapidly does the carbon-comprising support corrode. Thus, for example, about 60% of the carbon is corroded away by oxidation to carbon dioxide after 15 hours at a temperature of 180° C. in the case of Vulcan XC72® at potentials of 1.1 V. In the case of carbon blacks having a lower specific surface area, for example DenkaBlack® having a BET surface area of about 53 m$^2$/g, the corrosion stability of the support is higher since the proportion of graphitic material in the carbon black is higher. The corrosion is only a carbon loss of 8% after 15 hours at 1.1 V. At a potential of 1.2 V and a temperature of 180° C., the carbon loss of DenkaBlack® is 7% after one hour, 33% after 5 hours and 73% after 15 hours.

Apart from the use of a carbon support having a lower BET surface area in order to improve the corrosion stability of the overall system, it is known, for example, from WO-A 2006/002228, that the carbon-comprising support can be subjected to a surface treatment. The surface treatment provides the carbon with a metal carbide layer. As metal for producing the metal carbide layer, use is made of, for example, titanium, tungsten or molybdenum. To produce the metal carbide layer, a metal salt solution is firstly applied to the surface of the carbon-comprising support, and this metal salt is then reduced to the metal. The support is subsequently heated in order to convert the metal into metal carbide. Heating to form the metal carbide layer is carried out at a temperature in the range from 850 to 1100° C. However, it has been found that the carbide layer produced as described in WO-A 2006/002228 is incomplete, i.e. it comprises largely oxidic material which is reacted only at higher temperatures, for example at 1500° C. In addition, deposition of the metal in the first step is incomplete. A further disadvantage of the high temperatures which are necessary for the surface treatment is that the particles become very large, which can greatly alter, inter alia, the processing properties of the support. In addition, only carbides can be obtained by the process described, and this only in the case of selected metals, in particular tungsten or molybdenum. Other metals such as titanium or zirconium tend to oxidize under these conditions or react only at even higher temperatures.

Pure carbides have likewise been described as supports for electrocatalysts, but usually have very low surface areas, i.e. BET surface areas of less than 5 m$^2$/g, so that only relatively inactive catalysts can be produced thereon since the catalytically active material can be deposited in less finely divided form. The use of tungsten carbide as platinum-free anode catalyst also founders as a result of the low activity compared to platinum-based catalysts.

The process of the invention modifies the surface of the carbon-comprising support. This modification leads to an increase in the corrosion stability of the support. As a result of the metal carbides, metal nitrides, metal oxynitrides, metal carboxides, metal carboxynitrides and/or metal carbonitrides produced in step (c), the carbon is bound to the surface of the support and no longer undergoes any reaction with the oxygen surrounding the support. In this way, corrosion of the carbon-comprising support can be reduced and even avoided completely.

In contrast to known processes in which a metal carbide layer is produced on the carbon-comprising support, the process of the invention makes it possible to produce a larger number of compounds, for example various metal carbides or metal nitrides and also mixed phases derived therefrom.

The use of the carbon- and nitrogen-comprising organic substance and the at least one metal compound results in a carbide, nitride, carbonitride, carboxide, oxynitride or carboxynitride comprising one or more metals of the general formula $$M_a\text{-}C_xN_yO_z$$

where
    x+y+z=1,
    x=0 to 1,
    y=0 to 1 and
    z=0 to 0.5, preferably z<0.1 and particularly preferably z=0,
    a=0.05 to 20, preferably from 0.3 to 10,
being produced on the surface of the carbon-comprising support.

M represents one or more transition metals, preferably one or two transition metals, in particular of the IVth period and groups 4, 5 and 6 of the Periodic Table of the Elements. M is preferably selected from among titanium, vanadium, chromium, manganese, iron, cobalt, nickel, copper, zirconium, niobium, molybdenum, hafnium, tantalum and tungsten.

In a further preferred embodiment, the carbide, nitride, carbonitride, carboxide, oxynitride or carboxynitride comprising one or more metals produced on the surface of the carbon-comprising support as a result of the use of the carbon- and nitrogen-comprising organic substance and the at least one metal compound is additionally doped with a further metal and can be described by the general formula $$D_b(M_a\text{-}C_xN_yO_z)$$

where
    x+y+z=1,
    x=0 to 1,
    y=0 to 1 and
    z=0 to 0.5, preferably z<0.1, particularly preferably z=0,
    a=0.05 to 20, preferably from 0.3 to 10,
    b=0.0001 to 1, preferably b=0.001 to 0.1, particularly preferably b=0.01 to 0.05,
    M=one or more transition metals, preferably one or two transition metals, in particular of the IVth period and groups 4, 5 and 6 of the Periodic Table, preferably selected from among Ti, V, Cr, Man, Fe, Co, Ni, Cu, Zr, Nb, Mo, Hf, Ta, W and
    D=one or more metals, preferably one or two metals, particularly preferably one metal, in particular of groups 1 and 2 of the Periodic Table, preferably selected from among Li, Na, K, Rb, Cs, Mg, Ca, Sr, Ba; particularly preferably Li, Na, K and Ca.

The metal compound used for producing the catalyst according to the invention is preferably selected from among metal complexes or metal salts, for example halides, oxides, hydroxides and alkoxides of the transition metals. When halides are used, preference is given to chlorides.

When more than one metal is to be used for modifying the surface of the carbon-comprising support, it is usual to use different metal compounds, preferably metal salts. Preference is given to the metal compounds in each case comprising different metals but with the anion of the metal compounds being the same. However, it is also possible to use metal salts which comprise not only different metals but also different anions.

Particularly preferred metal salts used for producing the catalyst according to the invention are chlorides, for example tungsten chloride, molybdenum chloride, vanadium chloride, iron chloride, manganese chloride, chromium chloride, and also oxidic compounds, in particular ammonium heptatungstate, ammonium hexamolybdate, vanadium oxide, iron oxide. Alkoxides, for example titanium isopropoxide or zirconium butoxide, are also suitable.

Suitable carbon-comprising supports which can be used for producing the surface-modified carbon-comprising support are, for example, conductive carbon blacks, graphites, expanded graphites, graphenes or carbon nanotubes. Conductive carbon blacks are particularly preferably used as carbon-comprising supports, with preference being given to conductive carbon blacks having a BET surface area in the range from 30 to 1000 $m^2/g$. Particular preference is given to conductive carbon blacks having a BET surface area in the range from 30 to 250 $m^2/g$. As conductive carbon black, it is possible to use any carbon black which is known to those skilled in the art and has an appropriate BET surface area. Carbon blacks which are normally used are, for example, furnace black, flame black or acetylene black.

Preferred carbon blacks which can be used as carbon-comprising supports are, for example, SKW Carbon having a BET surface area of 72 $m^2/g$, DenkaBlack® having a BET surface area of 53 $m^2/g$ or XMB206® or AT325® from Evonik Degussa GmbH having a BET surface area of about 30 $m^2/g$. Carbon blacks having a higher BET surface area, for example Ketjen Black® having a BET surface area of 850 $m^2/g$ or Vulcan XC72® having a BET surface area of 253 $m^2/g$, are likewise possible. However, the abovementioned low surface area carbon blacks are particularly preferred.

To produce the surface-modified carbon-comprising support, the carbon-comprising support is mixed with at least one metal compound, a carbon- and/or nitrogen-comprising organic substance and optionally a solvent in a first step a).

Suitable carbon- and nitrogen-comprising organic substances are primary, secondary, tertiary and also cyclic amines, amides, carbamides, for example urea, ethylenediamine, ethanolamine, melamine, melam, melem, polymers thereof such as melon, and also compounds of the general formula $C_xN_y$ where x=1 to 6 and y=1 to 6, for example CN, $C_3N_4$, etc. In general, organic compounds of the formula $C_xN_yH_zO_n$ where x=1 to 30, preferably from 1 to 6, y=1 to 30, preferably y=2 to 12, z=0 to 30, preferably z=0 to 10, and n=0 to 5, preferably n=0, 1 or 2, are suitable. Among these, particular preference is given to urea, ethylenediamine and melamine.

The amount of carbon- and nitrogen-comprising organic substance is preferably selected so that the molar ratio of metal compound or the sum of all metal compounds to the carbon- and nitrogen-comprising organic substance is in the range from 1:1 to 1:20, in particular in the range from 1:5 to 1:10.

Apart from the metal compound and the carbon- and nitrogen-comprising organic substance, a solvent is preferably also added in order to obtain a paste-like composition. Suitable solvents are, for example, water, in particular when using chlorides which are not sensitive to hydrolysis, for example iron chloride, or when using oxides, for example tungstate or molybdate, or organic solvents, in particular alcohols, diols, for example glycols, or polyols, ketones, ethers when using hydrolysis-sensitive chlorides such as titanium tetrachloride, molybdenum chloride, tungsten chloride and mixtures thereof. Mixtures of two or more different solvents can also be used. When an alcohol is used, ethanol is particularly preferred.

To modify the surface of the carbon-comprising support by formation of metal carbides, metal nitrides, metal oxynitrides, metal carboxynitrides, metal oxycarbides and/or metal carbonitrides on the surface, the mixture produced in step a), which has optionally been dried in a second step b), is heated in the third step c). Heating is carried out at a temperature in the range from 500 to 1200° C., preferably in the range from 700 to 900° C. The temperature to which the mixture is heated is, in particular, dependent on the metal compound and the carbon- and nitrogen-comprising organic substance used.

Heating of the mixture can, for example, be carried out in a furnace. A suitable furnace is, for example, a rotary bulb furnace. A rotary tube furnace can also be used, either in batch operation or in continuous operation.

Apart from the use of a furnace, the use of a plasma or the use of microwave radiation is also possible for heating.

Particularly when a paste is produced by use of a solvent in step a), it is advantageous to evaporate the solvent at a temperature in the range from 40° C. to 100° C., optionally under subatmospheric pressure or in a vacuum, before heating in step b). To evaporate the solvent, it is possible to use any suitable evaporator or oven. Thus, for example, it is possible to remove the solvent from the mixture in a rotary evaporator. As an alternative, it is also possible for the mixture produced in step a) to be sprayed and dried in a spray dryer and, in a step following the spray dryer, to heat the spray-dried powder to a temperature in the range from 500 to 1200° C. The suspension to be sprayed usually has a solids content in the range from 1 to 30% by weight, preferably from 5 to 15% by weight. This suspension is generally sprayed at an inlet temperature in the range from 150° C. to 350° C.; the suspension cools very quickly and the actual drying step occurs at a starting temperature in the range of usually from 80 to 150° C. The use of a spray dryer for removing the solvent is preferred.

In a further preferred variant, all steps are carried out in a paddle dryer.

In order to prevent oxidation of the carbon-comprising support, preference is given to carrying out the heating in step b) in an inert atmosphere. A suitable inert atmosphere is, for example, a nitrogen atmosphere. As an alternative, particularly when a plasma is used, a noble gas atmosphere, for example an argon atmosphere, is also conceivable.

As an alternative, the heating for producing carbides or nitrides can also be carried out in a reactive atmosphere. For example, the atmosphere can comprise hydrocarbons, for example methane or ethane, $NH_3$, ethylamine, $H_2$ or mixtures thereof. A mixture with nitrogen or other inert gases is also possible here. However, preference is given to a nitrogen atmosphere.

The process of the invention makes it possible to produce a surface-modified carbon-comprising support which, based on the total mass of the carbon-comprising support, comprises from 1 to 80% by weight of metal. To achieve a targeted increase in the stability of the carbon-comprising support, the proportion of metal based on the total mass of the carbon-comprising support is at least 10% by weight, preferably about 20% by weight. In order not to alter the processability of the carbon-comprising support to an excessive degree, the proportion of metal based on the amount of carbon is preferably not more than 50% by weight. In the case of high surface area carbon blacks, for example KetjenBlack®, higher loadings are also possible, but usually not more than 80% by weight.

In contrast to the processes known from the prior art, in which the carbon of the carbon-comprising support is used for producing a metal carbide layer, the use of the carbon- and nitrogen-comprising organic substance makes it possible for the modification of the surface to be carried out by carbidization or nitridization at relatively low temperatures. Thus, for example, a temperature of 800° C. is sufficient for producing a tungsten carbide surface when using urea as carbon- and nitrogen-comprising organic substance, while a temperature of 1500° C. is required when the tungsten carbide is to be produced using the carbon of the carbon-comprising support.

The use of the carbon- and nitrogen-comprising organic substance also leads to a more rapid reaction, so that compounds which can otherwise not be used are also possible. Thus, for example, surface modification by means of nitrides, carbides and/or carbonitrides and also oxynitrides of titanium, hafnium or zirconium is also possible.

The production of carbides, nitrides or mixed phases can be adjusted by adjusting the ratio of metal compound to the carbon- and nitrogen-comprising organic substance. In addition, the heating rate and final temperature, the temperature ramp, and also the atmosphere used are critical in determining whether carbides, nitrides or mixed phases (carbonitrides, oxynitrides, carboxynitrides, oxycarbides) are obtained. For example, in the case of molybdenum (starting from molybdenum(V) chloride and 5 molar equivalents of urea) only amorphous molybdenum carbide is formed at 400° C., crystalline MoC is formed at 600° C. and $Mo_2C$ is formed at higher temperatures (800° C.). At a reaction temperature of 800° C., the phase composition can be shifted from $Mo_2C$ to MoC by increasing the proportion of urea (or in general terms the molar excess of the carbon- and nitrogen-comprising substance). In a further example, in the case of vanadium and modification of the surface of carbon blacks, pure supported vanadium carbide (VC) is obtained, while in the production of unsupported nanoparticles vanadium carbonitride is formed, with the proportion of carbide being higher when an additional carbon source is used than when only the chloride and urea are used (cf. examples 4 and 5 below).

The modification according to the invention of the surface of the carbon support by means of transition metal carbides or nitrides (or carbonitrides) increases the corrosion resistance of the support. As described above, this can be tested in an accelerated manner by application of an electric potential at elevated temperatures. Here, the amount of carbon removed is calculated from the amount of $CO_2$ formed.

When carbon supports having a relatively low surface area, i.e. a relatively high proportion of graphitic material, are used with the aim of increasing the stability, it must be borne in mind that the catalyst particles deposited thereon are usually somewhat larger and mostly located relatively close to one another, which promotes later sintering to form even larger particles. In the case of relatively large catalyst particles, the catalytic surface area is smaller in comparison to the amount of catalyst applied, i.e. only a relatively small proportion of the amount of catalytically active material applied to the support can be utilized catalytically and the system is accordingly less active on a mass basis.

As catalytically active material for electrochemical reactions, use is frequently made of noble metals, in particular metals of the platinum group, for example platinum, palladium, ruthenium, rhodium or iridium or alloys of the metals of the platinum group, and also of the copper group, for example copper, silver or gold or alloys thereof. Furthermore, metals of the platinum or copper group and also transition metals such as nickel, cobalt, vanadium, iron, titanium, chromium, etc., in each case individually or in combination with one or more further metals, can be used as alloy component.

Catalysts produced using the support according to the invention can be used, for example, in fuel cells. The catalysts can be used both on the anode side and on the cathode side. Particularly on the cathode side, it is necessary to use active cathode catalysts which are also corrosion-stable, with the stability being determined both by the stability of the support itself and by the interaction of catalyst particles with the support surface. As active cathode catalysts, use is generally made of alloy catalysts.

Apart from use as support for electrocatalysts as can be used, for example, in fuel cells, the carbon-comprising support is, for example, also suitable, owing to its improved corrosion stability, as corrosion-resistant filler, in particular as filler in electrode layers, as support for catalytically active material, for example noble metals such as platinum, palladium or silver, transition metals such as nickel, cobalt, vanadium, iron or titanium, alloys of these metals or oxides of one or more of these metals, for use in metal-air batteries or electrolysis cells, for example for the electrolysis of water. However, the carbon-comprising support produced according to the invention is particularly preferably used for electrocatalysts in which a noble metal-comprising catalytically active material is applied to the carbon-comprising support produced according to the invention.

When the carbon-comprising support is used for producing a catalyst, in particular an electrocatalyst as is used, for example in fuel cells, the surface-modified carbon-comprising support is cooled after formation of the surface modification and the catalytically active material is applied. Application of the catalytically active material can be effected by any method known to those skilled in the art. Thus, for example, the catalytically active material can be applied by deposition from solution. For this purpose, it is possible, for example, to dissolve metal compounds comprising the catalytically active material in a solvent. The metal can be bound covalently, ionically or by complexation. Furthermore, it is also possible for the metal to be deposited reductively, as precursor or under alkaline conditions by precipitation of the corresponding hydroxide. Further possibilities for depositing the catalytically active material are impregnation using a solution comprising the catalytically active material (incipient wetness), chemical vapor deposition (CVD) or physical vapor deposition (PVD) and all further processes known to those skilled in the art by means of which the catalytically active material can be deposited. When a metal of the platinum group is used as catalytically active material, preference is given to reductively precipitating a salt of the metal. Precipitation and washing are followed by drying to produce the catalyst.

Suitable catalytically active materials are, for example, metals of the platinum group (Pt, Pd, Ru, Rh, Ir) or the copper group (Cu, Ag, Au), transition metals (Ni, Co, V, Fe, Ti, Cr), alloys of these metals or an alloy comprising at least one metal of the platinum group.

For use as cathode catalyst in fuel cells, the catalytically active material is preferably selected from among platinum and palladium and alloys of these metals and alloys comprising at least one of these metals. The catalytically active material is very particularly preferably platinum or a platinum-comprising alloy. Suitable alloying metals are, for example, nickel, cobalt, iron, vanadium, titanium, ruthenium and copper, in particular nickel and cobalt. Suitable alloys comprising at least one metal of the platinum group are, for example, selected from the group consisting of PtNi, PtFe, PtV, PtCr, PtTi, PtCu, PtPd, PtRu, PdNi, PdFe, PdCr, PdTi, PdCu and PdRu. Particular preference is given to a platinum-nickel alloy, a platinum-iron alloy or a platinum-cobalt alloy, or a ternary alloy comprising PtNi, PtCo or PtFe. When an alloy is used as catalytically active material, the proportion of the metal of the platinum group in the alloy is preferably in the range from 25 to 85 atom % and preferably in the range from 40 to 80 atom %, more preferably in the range from 50 to 80 atom % and in particular in the range from 60 to 80 atom %.

Apart from the alloys mentioned, it is also possible to use alloys which comprise more than two different metals, for example ternary alloy systems.

When the catalytically active material is applied by precipitation, it is possible to use, for example, a reductive precipitation, for example of platinum from platinum nitrate in ethanol, by means of $NH_4OOCH$ or $NaBH_4$. As an alternative, decomposition and reduction in $H_2/N_2$, for example of platinum acetylacetonate mixed with the surface-modified carbon-comprising support, is also possible. Very particular preference is given to reductive precipitation by means of ethanol. In a further particularly preferred embodiment, the reductive precipitation is effected by means of formate, in particular ammonium formate.

When palladium or an alloy comprising a metal of the platinum group is used instead of platinum as catalytically active material, application of the catalytically active material is carried out correspondingly.

Finally, the catalytically active material can be applied directly during carbidization/nitridization, for example in the case of transition metals such as cobalt or nickel where metallic cobalt or nickel rather than cobalt carbide or nitride or nickel carbide or nitride is formed in a pure inert atmosphere (e.g. $N_2$ at 800° C.).

Corrosion of the carbon-comprising support can lead to detachment of the particles from the catalytically active material and thus to a decrease in performance of the system. in addition, the catalyst particles can also sinter, which leads to the catalytically active surface area decreasing significantly, likewise resulting in a decrease in performance.

A further advantage of the use of the carbon-comprising support for producing catalysts is that discharge of catalytically active material can be prevented by the layer comprising metal carbide, metal nitride and/or metal carbonitride, so that the catalytic activity of the catalyst produced is not reduced by catalytically active material which is discharged. The fact that the catalytically active material does not become detached from the support is related to the fact that the particles of the catalytically active material adhere better to the support due to the layer comprising metal carbide, metal nitride and/or metal carbonitride. As a result of the catalyst particles barely sintering and not becoming detached from the support, the catalytic surface area of the catalyst particles produced using the carbon-comprising support according to the invention remains stable over a long period of time and the performance, for example of an electrode for which the catalyst is used, remains high.

When the surface-modified carbon-comprising support produced according to the invention is used for producing catalysts, these catalysts can be used, for example, to produce electrodes which are used in electrochemical cells, for example batteries, fuel cells or electrolysis cells. A specific example is the use of the electrodes in fuel cells, for example proton-exchange membrane fuel cells (PEMFCs), direct methanol fuel cells (DMFCs), direct ethanol fuel cells (DEFCs), etc. Fields of application of such fuel cells are local energy generation, for example for household fuel cell systems, and also mobile applications, for example in motor vehicles. Particular preference is given to use in PEMFCs.

Apart from the use as support for electrocatalysts, the carbide-, nitride-, carbonitride-, carboxide-, oxynitride- or carboxynitride-modified carbon-comprising material can be used in electrodes, in particular as corrosion-resistant filler in electrodes. Such electrodes, which usually but not necessarily comprise a further catalytically or electrochemically active material, for example metal oxides, transition metals, etc., optionally supported on another material, can again be used in various electrochemical cells, for example batteries, electrolysis cells, fuel cells. Particular preference is given to use in batteries and among these especially in metal-air batteries.

Finally, the carbide-, nitride-, carbonitride-, carboxide-, oxynitride- or carboxynitride-modified carbon-comprising materials can themselves be used as catalysts. Transition metal carbides, in particular tungsten carbide, preferably supported, optionally comprising further elements, can be used as anode catalyst in fuel cells (PEMFC, DMFC, DEFC, etc.). Further catalytic applications are use as catalysts for the preparation of olefins by the Fischer-Tropsch process or as cathode catalyst (both for the oxygen evolution reaction (OER) and, particularly preferably, for the oxygen reduction reaction (ORR)) in metal-air batteries, etc.

EXAMPLES

1) Production Examples

Example 1

Surface Modification of Carbon Black by Means of Tungsten Carbide from Tungsten Chloride Using Urea 4.5 g of $WCl_4$ were dissolved in 50 ml of ethanol. A solution of 4.5 g of urea in 50 ml of ethanol was added thereto and the mixture was stirred for 30 minutes. 3.8 g of carbon black (AT325 from Evonik Degussa GmbH) and a further 50 ml of ethanol were subsequently added and the mixture was stirred for a further 30 minutes. The mixture was concentrated on a rotary evaporator until a viscous mass had been obtained, and this mass was then heated in a tube furnace at 100° C. for 2 hours in a nitrogen atmosphere and subsequently at 850° C. for 6 hours. The tungsten loading of the carbon-comprising support produced in this way was 35%, and the crystallite size of the carbide phase (WC) was 29 nm.

Example 2

Surface Modification of Carbon Black by Means of Tungsten Carbide from Ammonium Heptatungstate Using Urea 14 g of ammonium heptatungstate and 15.3 g of urea were dissolved in 300 ml of water. 10 g of carbon black (Denka-Black) were subsequently added and the mixture was homogenized by means of an Ultra-Turrax® at 8000 rpm for 15 minutes. The mixture obtained in this way was concentrated on a rotary evaporator until a viscous mass had been obtained, and this mass was then heated in a tube furnace firstly at 100° C. for 2 hours under a nitrogen atmosphere and subsequently at 850° C. for 6 hours.

The tungsten loading of the carbon-comprising support produced in this way was 37%, and the crystallite size of the carbide phases WC and $W_2C$ was 19 nm and 29 nm, respectively. The BET surface area was 26 $m^2/g$.

In the case of the material produced as described in example 2, the carbon loss (calculated on the basis of the carbon present) is 2% after one hour, 8% after 5 hours and 21% after 15 hours at a potential of 1.2 V and a temperature of 180° C. Based on the total support, the values are even lower by a factor of 2. In comparison, the carbon loss of Denka-Black® was 7% after only one hour, 33% after 5 hours and 73% after 15 hours, likewise at a potential of 1.2 V and a temperature of 180° C.

Example 3

Surface Modification of Carbon Black by Means of Vanadium Carbide from Vanadium Chloride Using Urea 3.9 g of $VCl_3$ were dissolved in 50 ml of ethanol. A solution of 5.4 g of urea in 50 ml of ethanol was added thereto and the mixture was stirred for 30 minutes. 3.5 g of carbon black (AT325 from Evonik Degussa GmbH) and also a further 50 ml of ethanol were subsequently added and the mixture was stirred for a further 30 minutes. The mixture was concentrated on a rotary evaporator until a viscous mass had been obtained, and this mass was then heated in a tube furnace firstly at 100° C. for 2 hours under a nitrogen atmosphere and subsequently at a temperature of 850° C. for 6 hours, likewise under a nitrogen atmosphere.

The vanadium loading of the carbon-comprising support produced in this way was 21%, and the crystallite size of the carbide phase (VC) was 53 nm.

Example 4

Surface-Modification of Carbon Black by Means of Vanadium Carbide from Vanadium Oxide Using Urea 4.1 g of vanadium(V) oxide and 14.8 g of urea were dispersed in 250 ml of water. 2.5 g of carbon black (Denka-Black®) were subsequently added and the mixture was homogenized by means of an Ultra Turrax® at 8000 rpm for 15 minutes. The mixture obtained in this way was concentrated on a rotary evaporator until a viscous mass had been obtained, and this mass was then heated in a tube furnace firstly at 100° C. for 2 hours under a nitrogen atmosphere and subsequently at 850° C. for 6 hours. This was followed by cooling to room temperature.

The vanadium loading of the carbon-comprising support produced in this way was 53%. The crystallite size was about 80 nm and therefore somewhat larger than in the case of the vanadium carbide produced from vanadium chloride (cf. example 3)

Example 5

Preparation of Vanadium Carbide (Unsupported) from Vanadium Chloride Using Urea 12.5 g of $VCl_3$, 23.8 g of urea and 0.9 g of Vulcan XC72 carbon black (Cabot Technologies) as additional carbon source were added to 100 ml of ethanol. The paste-like mixture was mixed and made inert while flushing with nitrogen (10 standard l/h) in a rotary bulb furnace for 30 minutes. The mixture was then, still under a stream of nitrogen, heated to 80° C. at a heating rate of 2 K/min, then to 300° C. at a heating rate of 1 K/min and finally to 800° C. at a heating rate of 3 K/min. The temperature was maintained at 800° C. under a nitrogen atmosphere for 6 hours before the product was slowly cooled to room temperature.

The synthesis gave a vanadium carbonitride having a vanadium loading of 45% by weight; the crystallite size was 49 nm. The ratio of carbide to nitride was 1.6:1.

In an alternative preparative method without use of an additional carbon source, i.e. using only $VCl_3$ and urea, under otherwise identical experimental conditions, a vanadium carbonitride is likewise formed but has a higher proportion of nitride.

Example 6

Mixed Carbide—$Fe_{2.1}Mn_{0.9}C_1$ 41.8 g of iron(III) chloride (hexahydrate), 12.8 g of manganese(II) chloride (tetrahydrate), 96.8 g of urea and 3.9 g of carbon black (Vulcan XC72 from Cabot) were dispersed in 400 ml of ethanol, flushed and mixed under a stream of nitrogen (10 standard l/h) in a rotary bulb furnace for 30 minutes. The mixture was then heated to 80° C. at a heating rate of 2 K/min, further to 300° C. at a heating rate of 1 K/min and finally to 800° C. at a heating rate of 3 K/min, maintained at 800° C. for 6 hours and then cooled to room temperature.

Example 7

Mixed Carbide with Metal Doping—$K_{0.023}(Fe_{2.4}Mn_{0.6})C_1$ 0.08 g of potassium carbonate, 39.77 g of iron(III) chloride, 12.12 g of manganese chloride, 264.85 g of melamine and 100 ml of ethanol are weighed together into a 1000 ml fused silica flask and subsequently mixed well after addition of the ethanol. The mixture is calcined in a rotary bulb furnace in a nitrogen atmosphere at a throughput of 40 standard l/h. For this purpose, the mixture is firstly mixed at ambient temperature in a rotary bulb furnace by rotation of the furnace for 30 minutes, in a next step heated to 300° C. over a period of 180 minutes, then heated further to 850° C. over a period of 150 minutes and maintained at 850° C. for 240 minutes. The support produced in this way is subsequently cooled.

Example 8

Carbonitride—TaCN 9.3 g of $TaCl_5$, 15.6 g of urea and 0.6 g of Vulcan XC72 carbon black (Cabot Technologies) as additional carbon source were introduced into 100 ml of ethanol. The paste-like mixture was mixed and made inert while flushing with nitrogen (10 standard l/h) in a rotary bulb furnace for 30 minutes. The mixture was then, still under a stream of nitrogen, heated to 80° C. at a heating rate of 2 K/min, subsequently to 300° C. at a heating rate of 2 K/min and finally heated to 800° C. at a heating rate of 3 K/min. The temperature was maintained at 800° C., still under a nitrogen atmosphere, for 6 hours, before the mixture was slowly cooled to room temperature.

The synthesis gave a tantalum carbonitride having a tantalum loading of 75% by weight. The ratio of carbide to nitride was 1.8:1.

Leaving out the additional carbon source in the form of carbon black, i.e. $TaCl_5$ and 5 molar equivalents of urea under otherwise identical experimental conditions, gives pure tantalum nitride.

When the proportion of urea and/or the additional carbon source is increased, the proportion of carbide increases.

Example 9

TiN on DenkaBlack® Carbon Black 7.6 g of titanium tetrachloride were slowly, in small portions, dissolved in 20 ml of ice-cold ethanol. This solution was added to 10 molar equivalents of urea (24.0 g) and 3.8 g of DenkaBlack® and the paste-like mixture was mixed and made inert while flushing with nitrogen (10 standard l/h) in a rotary bulb furnace for 30 minutes. To carry out the calcination, the mixture was heated to 300° C. over a period of 180 minutes in a first step, then heated further to 800° C. over a period of 150 minutes and maintained at 800° C. for 240 minutes. The support produced in this way is subsequently cooled.

The titanium nitride loading (as TiN) was 25% by weight and the crystallite size was 9.5 nm.

Example 10

Surface Modification of Carbon Black by Means of Molybdenum-Tungsten Carbide from the Corresponding Chlorides and Urea 3.3 g of tungsten(VI) hexachloride, 2.3 g molybdenum(V) pentachloride and 4.9 g of urea are slowly dissolved in 50 ml of ethanol, and 2.5 g of Vulcan XC72 (Cabot Technologies) are subsequently added. The mixture is mixed and made inert under nitrogen (10 standard l/h) in a rotary bulb furnace for 30 minutes. The calcination under a nitrogen atmosphere (10 standard l/h of nitrogen) is carried out by heating to 300° C. at 2 K/min, then to 800° C. at 3 K/min and holding 800° C. for 6 hours. The product is subsequently cooled under nitrogen.

Example 11

Surface Modification of Carbon Black by Means of Molybdenum-Tungsten Carbide from the Corresponding Oxides (Tungstate and Molybdate) and Urea 2.1 g of ammonium tungstate, 1.5 g of ammonium molybdate and 4.9 g of urea are dissolved in 100 ml of water, and 2.5 g of Vulcan XC72 (Cabot Technologies) are subsequently added and the suspension is homogenized by means of an Ultra-Turrax® for 15 minutes. The mixture is subsequently concentrated at 40-50° C. and 40 mbar on a rotary evaporator and calcined under nitrogen (40 standard l/h) in a tube furnace. For this purpose, the furnace is firstly made inert at room temperature for 30 minutes, then heated to 100° C. at a heating rate of 1 K/min, then to 850° C. at a heating rate of 3 K./min and the temperature is maintained at 850° C. for 6 hours. The product is subsequently cooled under nitrogen.

Example 12

Production of a Tungsten Carbide-Modified Carbon Support by Means of Spray Drying and Calcination A suspension having a solids content of about 13% by weight of ammonium tungstate (32.5 g), melamine (80.5 g) and DenkaBlack® (25 g) in 1 l of water was produced and homogenized by means of an Ultra-Turrax® for 30 minutes. The mixture was processed in a spray dryer at an inlet temperature of 250° C. and an outlet temperature of 150° C. to give a powder.

The spray-dried powder obtained in this way was calcined under nitrogen (40 standard l/h) in a tube furnace. For this purpose, the furnace was firstly made inert at room temperature for 30 minutes, then heated to 100° C. at a heating rate of 1 K/min, then heated to 850° C. at a heating rate of 3 K/min and the temperature was maintained at 850° C. for 6 hours. The product was subsequently cooled under nitrogen.

Example 13

Surface Modification of a Carbon Black Support and Simultaneous Application of the Catalytic Active Material from Cobalt Chloride and Urea 3.7 g of cobalt(II) chloride (hexahydrate) and 4.6 g of urea were dissolved in 100 ml of water. 4 g of Vulcan XC72 carbon black were added thereto. The mixture was mixed and made inert while flushing with nitrogen (10 standard l/h) in a rotary bulb furnace for 30 minutes. The calcination under nitrogen was carried out by heating to 300° C. at 2 K/min, then to 700° C. at 3 K/min. The temperature was maintained at 700° C. for 6 hours and the product was then cooled.

This method can also be carried out analogously using ethylenediamine (EDA, example 12-EDA) or melamine. It is also possible to use cobalt acetate, cobalt hydroxide, cobalt nitrate or cobalt sulfate in place of cobalt chloride. In all cases, a nitrogen-modified carbon support with metallic cobalt (crystallite sizes in the range from 10 to 60 nm, depending on the maximum temperature—at 700° C. in the range from 10 to 25 nm) is formed. In these process alternatives, the use of EDA or melamine in a molar excess of from 5 to 10 and the use of cobalt chloride or cobalt hydroxide is particularly preferred.

Example 14

Production of an Electrocatalyst on a Surface-Modified Carbon-Comprising Support as per Example 1

4.4 g of the surface-modified carbon-comprising support produced in example 1 were dispersed in 500 ml of water and homogenized by means of an Ultra Turrax® at 8000 rpm for 15 minutes. 3.28 g of platinum nitrate were dissolved in 100 ml of water and slowly added to the homogenized dispersion comprising the carbon-comprising support. 355 ml of water and 285 ml of ethanol were subsequently added to the mixture and the mixture was heated under reflux for 6 hours. After cooling overnight, the suspension was filtered, the solid was washed free of nitrate with 3 l of hot water and dried under reduced pressure. The platinum loading of the catalyst produced in this way was 29.6% and the average crystallite size in the XRD pattern was 3.5 nm.

Example 15

Production of an Electrocatalyst on a Surface-Modified Carbon-Comprising Support as Per Example 3

1.6 g of the carbon-comprising support produced in example 2 were dispersed in 100 ml of water and homogenized by means of an Ultra Turrax® at 8000 rpm for 15 minutes. 0.69 g of platinum nitrate was dissolved in 50 ml of water and slowly added to the dispersion comprising the carbon-comprising support. 105 ml of water and 85 ml of ethanol were subsequently added to the mixture and the mixture was heated under reflux for 6 hours. After cooling overnight, the suspension was filtered and the solid was washed free of nitrate with 3 l of hot water and dried under reduced pressure. The platinum loading was 30% and the average crystallite size in the XRD pattern was 3.5 nm.

2) Comparative Production Examples

Comparative Example 1

Surface Modification of Carbon Black by Means of Tungsten Carbide without C/N-Comprising Organic Substance at 850° C.

5.9 g of ammonium heptatungstate were dissolved in 580 g of water, and 16 g of carbon black (AT325 from Evonik Degussa GmbH) were added thereto. This mixture was homogenized by means of an Ultra Turrax® at 8000 rpm for 30 minutes. The suspension produced in this way was concentrated on a rotary evaporator and heated in a tube furnace under a nitrogen atmosphere firstly at 400° C. for 1 hour and then at 850° C. for 6 hours. The tungsten loading was 7%. No tungsten carbide phase but only $H_2WO_4 \times H_2O$ was found in the XRD pattern.

At a calcination temperature of 1500° C. instead of 850° C., tungsten carbide was formed even without use of urea or another C/N source, but this has larger crystallites than that in example 1.

Comparative Example 2

Reworking of the Preparation from WO 2006/002228—Surface Modification of Carbon Black by Means of Tungsten Carbide The preparation was carried out by a method analogous to that described in WO 2006/002228. For this purpose, 8 g of Vulcan XC72 were suspended in 1000 g of $H_2O$ and homogenized by means of an Ultra-Turrax at 8000 rpm for 30 minutes. 3.2 g of ammonium tungstate were dissolved in 200 ml of $H_2O$ and slowly added to the suspension. A further 750 ml of $H_2O$ were added to the mixture and the mixture was heated under reflux for 4 hours. 30.4 g of $NaBH_4$ were subsequently dissolved in 100 ml of water and added dropwise over a period of one hour with vigorous gas evolution and the mixture was heated under reflux for a further 20 minutes. The reaction mixture was filtered and the solid was washed with 2 l of $H_2O$. The filter cake which was still moist with water was heated in a tube furnace, firstly at 100° C. for 1 hour and subsequently at 900° C. for 1 hour. Only traces of tungsten could be detected (0.05%).

Comparative Example 3

Production of Tungsten Carbide Nanoparticles from Ammonium Tungstate and Melamine 6.5 g of ammonium tungstate, 22.5 g of melamine and 0.3 g of Vulcan XC72 carbon black (Cabot Technologies) as additional carbon source were introduced into 100 ml of water. The paste-like mixture was mixed and made inert while flushing with nitrogen (10 standard l/h) in a rotary bulb furnace for 30 minutes. The mixture was then, still under a stream of nitrogen, heated to 300° C. at a heating rate of 2 K/min and subsequently to 800° C. (heating rate: 3 K/min). The temperature was maintained at 800° C. for 6 hours ($N_2$), before the product was slowly cooled to room temperature.

Comparative Example 4

Production of an Electrocatalyst on Unmodified Carbon Black 7.0 g of carbon black (AR325 from Evonik Degussa GmbH) were dispersed in 500 ml of water and homogenized by means of an Ultra Turrax® at 8000 rpm for 15 minutes. 5.13 g of platinum nitrate were dissolved in 100 ml of water and slowly added to the carbon black dispersion. 200 ml of water and 800 ml of ethanol were subsequently added to the mixture and the mixture was heated under reflux for 6 hours. After cooling overnight, the suspension was filtered and the solid was washed free of nitrate with 2 l of hot water and dried under reduced pressure. The platinum loading was 27.4% and the average crystallite size in the XRD pattern was 3.2 nm.

Comparative Example 5

Production of an Electrocatalyst on Tungsten Carbide Nanoparticles 4 g of nanoparticulate tungsten carbide from SDC Materials, particle size 6 nm, were dispersed in 50 ml of water and homogenized by means of an Ultra Turrax® at 8000 rpm for 15 minutes. 5.13 g of platinum nitrate were dissolved in 100 ml of water and slowly added to the carbon black dispersion. 200 ml of water and 900 ml of ethanol were subsequently added to the mixture and the mixture was heated under reflux for 6 hours. After cooling overnight, the suspension was filtered and the solid was washed free of nitrate with 2 l of hot water and dried under reduced pressure. The platinum loading was 42% and the average platinum crystallite size in the XRD pattern was 3.0 nm.

Comparative Example 6

Production of an Ag-Based Electrocatalyst on Unmodified Carbon Black 24 g of carbon black support (SKW Acetylene Black) were dispersed in 2 l of water and homogenized by means of an Ultra-Turrax (8000 rpm) for 15 minutes. 9.65 g of silver nitrate were dissolved in 300 ml of water and added to the carbon suspension. The mixture was introduced into a nitrogen-flushed stirred apparatus and flushed with nitrogen for a further 15 minutes before a sodium borohydride solution (10.5 g of $NaBH_4$ in 200 ml of water) was added dropwise over a period of about 5 minutes. The mixture was stirred at room temperature for another 2 hours.

The catalyst was filtered off, washed free of nitrate with 1.5 l of hot water and dried.

The silver loading was 20.1% by weight and the average crystallite size in the XRD pattern was 40 nm.

3) Electrochemical Characterizations

Example 16

Comparison of the corrosion resistance (in an acidic medium) of electrocatalysts on various supports by means of a rotating disk electrode The decrease in performance of electrocatalysts can be estimated by means of accelerated aging tests. For example, measurements by means of a rotating disk electrode (RDE) can be carried out for this purpose.

When electrocatalysts are used in polymer electrolyte fuel cells as can be used, for example, in automotive applications, activity and stability of the catalysts in an acidic medium are critical.

Activity and stability studies on the cathode reaction, i.e. the oxygen reduction reaction, are of particular interest since this usually proceeds with relatively large overvoltages and thus greater decreases in performance than the anode reaction (hydrogen oxidation). For accelerated aging tests, the catalyst can be subjected to rapid load changes and/or high potentials (>1 V, usually >1.2 V), e.g. in the form of rapid potential cycles (scanning rates of 50-1000 mV/s, potentials ranging from about 0.5 to 1.4 V, several hundred cycles) or constantly high potentials (e.g. 1.4 V for 100 h). A possible test procedure can be, for example, firstly to determine the catalytic activity in respect of the reduction of oxygen (cathode reaction) of the catalyst, then to carry out potential cycles and finally measure the final activity.

The RDE measurements to determine the activity are carried out in oxygen-saturated 1 M $HClO_4$. The catalyst to be examined is applied to a glassy carbon electrode having an area of 1 $cm^2$. The loading is about 15-20 μg of active composition (e.g. platinum). A platinum sheet serves as counter electrode. The reference electrode is a mercury-mercury sulfate electrode. All potentials are reported relative to the reversible hydrogen electrode (RHE). Five cycles between 50 and 950 mV (RHE) are carried out at a speed of 5 mV/s and a speed of rotation of the disk of 1600 rpm. The evaluation to determine the activity in respect of the reduction of oxygen is carried out at 900 mV: the ratio of the product and the difference between limiting diffusion current and kinetic current at 900 mV is formed and normalized to the amount of platinum. This gives a mass-specific activity. Pure supported platinum catalysts typically have activities for the reduction of oxygen in the range from 100 to 120 mA/mg of Pt.

To determine the corrosion resistance, 150 potential cycles between 0.5 and 1.3 V (at 50 mV/s in an oxygen-saturated electrolyte) were carried out before the activity was again carried out by means of five cycles between 50 and 950 mV (5 mV/s). Table 1 shows the decreases in activity after the potential cycles compared to the initial activity for a few samples.

It can clearly be seen that the catalyst on the carbon-comprising support which has been surface-modified according to the invention is more stable than both the pure tungsten carbide and the catalyst on unmodified carbon black.

TABLE 1

Decrease in activity in respect of the reduction of oxygen

| Sample | Decrease in activity after 150 cycles between 0.5 and 1.3 V relative to the initial activity at 0.9 V (%) |
| --- | --- |
| 30% of Pt on 30% of WC/carbon black AT325 (800° C., urea), (example 14) | −10% |
| 30% of Pt on carbon black AT325 (comparative example 4) | −48% |
| 42% of Pt on WC (comparative example 5) | −35% |

Example 17

Comparison of the Activity and Stability of Electrocatalysts in an Alkaline Medium Apart from applications of electrocatalysts in polymer electrolyte fuel cells, which require a high activity and selectivity in an acidic medium, there are also applications in an alkaline medium. These include, for example, metal-air batteries. Here too, the cathode reaction is the oxygen reduction reaction and the stability of the catalyst at high potentials has to meet demanding requirements.

RDE measurements to determine the activity or accelerated aging tests are carried out in oxygen-saturated 1 M KOH. The catalyst to be examined is applied to a glassy carbon electrode having an area of 1 $cm^2$. The loading is about 100 μg of catalyst, i.e. a 20% loading with active composition corresponds to about 20 μg of active component. A platinum sheet serves as counter electrode. The reference electrode is a mercury-mercury oxide electrode. All potentials are reported relative to the reversible hydrogen electrode (RHE).

Ten cycles between 50 and 1320 mV (RHE) are carried out at a speed of 5 mV/s and a speed of rotation of the disk of 1600 rpm.

An electrocatalyst frequently used in an alkaline medium, viz. silver on carbon (comparative example 6), displays measurable reduction currents only at potentials of <860 mV, i.e. the overvoltage for the reduction of oxygen is about 370 mV. A current density of $-1$ mA/cm$^2$ is obtained only at a potential of 759 mV. In addition, the activity decreases relatively quickly: after ten potential cycles between 50 and 1320 mV, the curve has been shifted by a further 33 mV to lower potentials. This shows the necessity of more stable and more active catalysts.

The catalyst according to the invention (example 12) displays such an improvement while additionally avoiding the use of expensive noble metals since cobalt is used in place of silver. At the same loading, the onset potential can be shifted to about 885 mV. In addition, the reduction of oxygen occurs with lower kinetic hindrance since the curve is very steep. A current density of $-1$ mA/cm$^2$ is achieved at potentials of 831 mV, i.e. an improvement of more than 70 mV compared to the silver catalyst. In addition, the catalyst is significantly more stable. After 10 cycles, the curve has been shifted by only 3 mV toward lower potentials.

If the catalyst of example 12 is produced using ethylenediamine (example 12 EDA) instead of urea, a further improvement in the activity can be achieved (onset at ~920 mV; $-1$ mA/cm$^2$ achieved at 862 mV), without the stability becoming significantly worse (shift by 4 mV after 10 cycles).

TABLE 2

Decrease in activity in an alkaline medium

| Sample | Activity (potential (mV) at $-1$ mA) | Stability after 10 cycles (shift (in mV) at $-1$ mA/cm$^2$) |
|---|---|---|
| 20% of Co—N—C (example 12) | 831 mV | $-3$ mV (0.4%) |
| 20% of Co—N—C (example 12-EDA) | 862 mV | $-4$ mV (0.5%) |
| 20% of Ag on SKW Acetylene Black (comparative example 6) | 759 mV | $-33$ mV (4.4%) |

Example 18

Comparison of the Catalytic Activity of Carbides Prepared by Various Methods for the Example of the Hydrogen Oxidation Reaction (Anode Reaction in Fuel Cells, PEMFC)

The hydrogen oxidation reaction is catalyzed in an excellent way with virtually no overvoltage by platinum catalysts; even very low loadings, e.g. 0.05 mg of Pt/cm$^2$, are sufficient for this. Nevertheless, non-noble metal alternatives are sought for the anode catalyst because of the high price of platinum. Tungsten carbide has a density of electronic states which is very similar to that of platinum, as a result of which it is considered to be an ideal candidate for replacing platinum as catalyst, including for the oxidation of hydrogen. However, this reaction proceeds much less well and with a higher overvoltage over tungsten carbide, which can be attributed at least partly to the excessively large particles.

The hydrogen oxidation reaction can, like the oxygen reduction reaction, be characterized ex-situ by means of an RDE. For this purpose, 60 µg of the tungsten carbide-based catalyst to be examined are applied to the glassy carbon electrode. 0.5 M H$_2$SO$_4$ is used as electrolyte. All other parameters are unchanged, compared to example 16. In addition, a catalyst composed of 5% of Pd on carbon (Heraeus #00537, loading on electrode=47 µg of catalyst/cm$^2$, i.e. 2.3 µg of Pd/cm$^2$) was used for comparison. Two cycles between $-50$ and 1000 mV (RHE) are carried out in each case at a speed of 20 mV/s in the hydrogen-saturated electrolyte.

The Pd catalyst, similarly to Pt, oxidizes the hydrogen virtually immediately and even after only 50 mV achieves a current density of 1 mA/cm$^2$, above about 100 mV a plateau (limiting diffusion current) of about 1.8 mA/cm$^2$ is achieved, corresponding to a value of about 800 mA/mg of Pd.

In the case of tungsten carbide, the loading of the electrode is about one order of magnitude higher. Despite this, only very small currents (<0.1 mA/cm$^2$) are measured. In all cases, the plateau is reached in the range from 50 to 100 mV (vs RHE), and the current may then increase slightly more.

A commercially available, unsupported tungsten carbide (SDC Materials, 6 nm particle diameter) which had been produced by means of plasma synthesis displayed virtually no current (0.2 mA/mg of WC at 50 mV). The nanoparticulate tungsten carbide prepared as described in comparative example 3, which had larger particles (about 20 nm), displays, in contrast, higher currents (1.3 mA/mg of WC at 50 mV). Even larger currents and also a relatively steep increase are displayed by the surface-modified carbon supports produced according to the invention. Depending on the precise method of production (e.g. use of chloride or tungstate, type of carbon black support), the values are in the range from 5 to 7 mA/mg of WC at 50 mV. The supports which had been modified according to the prior art (comparative examples 1 and 2) likewise displayed only very small currents in the region of 0.6 mA/mg.

Significant improvements in the catalytic activity in respect of the oxidation of hydrogen could be achieved using the surface modification according to the invention of carbon supports by means of tungsten carbide. Corresponding effects should likewise be expected for other applications in which a stable dispersion of finely divided carbide particles on a support surface is required.

The invention claimed is:

1. A process for producing a surface-modified carbon-comprising support, comprising:
    (a) mixing a carbon-comprising support with (i) at least one metal compound, (ii) an organic substance comprising carbon, nitrogen, or both carbon and nitrogen, and (iii) optionally a dispersion medium;
    (b) optionally evaporating the dispersion medium at a temperature in the range from 40 to 200° C.; and
    (c) heating a resulting mixture to a temperature in the range from 500° C. to 1200° C. in an inert atmosphere to form at least one selected from the group consisting of a metal carbide, a metal nitride, a metal oxycarbide, a metal oxynitride, a metal carboxynitride and a metal carbonitride on the carbon-comprising support.

2. The process of claim 1, wherein the metal compound is in the form of a salt selected from the group consisting of a chloride, an oxide, a hydroxide and an alkoxide of a transition metal.

3. The process of claim 2, wherein the transition metal is selected from the group consisting of a metal of the 4th period and a metal of group 4 to 6 of the Periodic Table of the Elements.

4. The process of claim 2, wherein the transition metal is selected from the group consisting of titanium, zirconium, vanadium, niobium, tantalum, chromium, molybdenum, tungsten, iron, cobalt and nickel.

5. A surface-modified carbon-comprising support produced by the process of claim 4.

6. The process of claim 1, wherein the carbon-comprising support is selected from the group consisting of a conductive carbon black, a graphite, a graphene and a carbon nanotube.

7. A surface-modified carbon-comprising support produced by the process of claim 6.

8. The process of claim 1, wherein the carbon-comprising support has a BET surface area in the range from 30 to 1000 $m^2/g$.

9. The process of claim 1, wherein the organic substance is selected from the group consisting of urea, ethylenediamine, ethanolamine, melamine, melam, melem, a polymer thereof, a compound of the general formula $C_xN_y$, wherein x=1 to 6 and y=1 to 6, and an organic compound of the formula $C_xN_yH_zO_n$, wherein x=1 to 30, y=1 to 30, z=0 to 30, and n=0 to 5.

10. A surface-modified carbon-comprising support produced by the process of claim 9.

11. The process of claim 1, wherein the organic substance is an organic compound of the formula $C_xN_yH_zO_n$, where x=1 to 6, y=2 to 12, z=0 to 10, and n=0, 1 or 2.

12. The process of claim 1, wherein a molar ratio of the metal compound to the organic substance is in the range from 1:1 to 1:10.

13. The process of claim 1, wherein the dispersion medium is water, an organic solvent or a mixture of different organic solvents.

14. The process of claim 1, wherein the evaporation of the dispersion medium in step (b) is carried out in a rotary evaporator, in a spray dryer or in a paddle dryer.

15. The process of claim 1, wherein the heating is carried out in a rotary tube furnace, using microwave radiation or in a plasma.

16. A surface-modified carbon-comprising support produced by the process of claim 1.

17. The surface-modified carbon-comprising support of claim 16, wherein the support is suitable as a catalytically active metal in an electrochemical cell, a fuel cell, an electrolysis cell or a battery.

18. The surface-modified carbon-comprising support of claim 16, wherein the support is suitable as a catalyst, a corrosion-resistant filler in an electrode, or as a support for a catalytically active metal.

* * * * *